United States Patent
Chaumont et al.

(10) Patent No.: US 10,180,197 B1
(45) Date of Patent: Jan. 15, 2019

(54) PROTECTIVE HOUSING FOR CONFIGURING A PROGRAMMING MODULE OF AN INDUSTRIAL PRODUCT

(71) Applicant: Honeywell International Inc., Morris Plains, NJ (US)

(72) Inventors: Remy Chaumont, Echirolles (FR); Pascal Schweizer, Montbonnot-Saint-Martin (FR); Christophe LeMoing, Montbonnot-Saint-Martin (FR)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/698,382

(22) Filed: Sep. 7, 2017

(51) Int. Cl.
| | | |
|---|---|---|
| *H01H 21/08* | (2006.01) | |
| *F16K 37/00* | (2006.01) | |
| *F16K 31/122* | (2006.01) | |
| *G05D 16/06* | (2006.01) | |
| *B67B 3/26* | (2006.01) | |

(52) U.S. Cl.
CPC .......... *F16K 37/0041* (2013.01); *B67B 3/26* (2013.01); *F16K 31/122* (2013.01); *G05D 16/0661* (2013.01); *G05D 16/0691* (2013.01); *F17C 2205/0329* (2013.01)

(58) Field of Classification Search
CPC ..... F16K 37/0041; F16K 31/122; B67B 3/26; G05D 16/0661; G05D 16/0691; F17C 2205/0329; H01H 21/08; H01H 2009/048; H01H 9/04

USPC ............... 200/302.2, 302.1, 302.3
See application file for complete search history.

(56) References Cited

U.S. PATENT DOCUMENTS

| | | | | |
|---|---|---|---|---|
| 3,928,742 A | * | 12/1975 | Rule | F16J 15/50 |
| | | | | 200/302.3 |
| 5,788,059 A | * | 8/1998 | Jahangiri | H01H 21/08 |
| | | | | 200/302.3 |
| 6,573,466 B1 | * | 6/2003 | Rapp | H01H 13/063 |
| | | | | 200/302.2 |

(Continued)

FOREIGN PATENT DOCUMENTS

| | | |
|---|---|---|
| DE | 19642182 A1 | 4/1997 |
| EP | 1505325 B1 | 11/2006 |
| WO | WO-2009/019279 A2 | 2/2009 |

*Primary Examiner* — Edwin A. Leon
(74) *Attorney, Agent, or Firm* — Craige Thompson; Thompson Patent Law; Vincent Musgrove

(57) ABSTRACT

Apparatus and associated methods relate to a housing having a deformable membrane configured to interface with a programming module of an industrial product, where the deformable membrane includes a waved surface designed to deform under the finger pressure of a human user. In an illustrative example, the housing may be formed of a rigid material (e.g., polyamide) to serve as a protective barrier for the industrial product. The waved surface may have one or more waves (e.g., 7) that may possess certain dimensions and deformation parameters that are designed to allow a user to engage a programming switch via the deformable membrane. A user may advantageously provide input to the programming module via the deformable membrane without having to access the internal areas of the industrial product, thus avoiding the risk of damaging or interfering with the internal mechanisms and systems of the industrial product.

20 Claims, 7 Drawing Sheets

(56) References Cited

U.S. PATENT DOCUMENTS

| | | | |
|---|---|---|---|
| 7,964,812 B1 * | 6/2011 | Schwinn | H01H 9/04 200/302.3 |
| 2009/0121168 A1 | 5/2009 | Muzzo et al. | |
| 2017/0159846 A1 | 6/2017 | Kraft et al. | |

* cited by examiner

PROTECTIVE HOUSING FOR CONFIGURING A PROGRAMMING MODULE OF AN INDUSTRIAL PRODUCT

TECHNICAL FIELD

Various embodiments relate generally to housing components for industrial equipment.

BACKGROUND

Industrial products and machines are used in a variety of industries for automating manufacturing of goods, production of materials, and other industrial processes. For example, the alcoholic beverage industry employs filtration systems, valves, and liquid pumps to manufacture mass quantities of beer and other alcoholic drinks. These complex industrial systems are frequently automated using electronics, actuators, hardware, and software, which may provide for more uniform and predictable quality for these mass-produced goods.

Programming electronics and software for these industrial systems may be an involved process requiring the skills and expertise of a computer engineer or a computer scientist. Some systems can be configured so that programming them requires only a basic level of knowledge and understanding. Laypersons may be able to program such systems using a simplified interface with a minimal number of inputs.

SUMMARY

Apparatus and associated methods relate to a housing having a deformable membrane configured to interface with a programming module of an industrial product, where the deformable membrane includes a waved surface designed to deform under the finger pressure of a human user. In an illustrative example, the housing may be formed of a rigid material (e.g., polyamide) to serve as a protective barrier for the industrial product. The waved surface may have one or more of waves (e.g., 7) that may possess certain dimensions and deformation parameters that are designed to allow a user to activate a programming switch via the deformable membrane. A user may advantageously provide input to the programming module via the deformable membrane without having to access the internal areas of the industrial product, thus avoiding the risk of damaging or interfering with the internal mechanisms and systems of the industrial product.

Various embodiments may achieve one or more advantages. For example, some embodiments may provide for a protective barrier, which prevents the entry of liquids and other contaminants into the industrial product. In some embodiments, the housing may provide for a low-cost solution to allow a lay-user to program the industrial product with minimal involvement, minimal risk of damage the industrial product, and maximal safety to the user. For example, the housing may avoid the occurrence of electrostatic discharge from an electronic circuit board to a user. In various examples, the housing may be transparent to allow for indicator lights within the industrial product to be seen by the user from outside the housing. Such transparency may permit illumination of the pressing area location. Furthermore, the exact deformation of the deformable membrane may be tailored to the pressure of a human user's finger push, so that the membrane temporarily deforms just enough to engage with the programming module without the deformation being permanent. In some examples, the housing may create a tight seal with the industrial product that is easy to set up and attach to the industrial product. In some embodiments, a relatively small membrane (e.g., 35 mm in diameter) may achieve the requisite deformation to actuate an internal switch. This may allow for the other areas of the housing to be strong and fully resilient in an industrial environment. The ability to configure the product from the outside may advantageously allow for configuration of explosion-proof products without de-energizing them during the configuration process.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
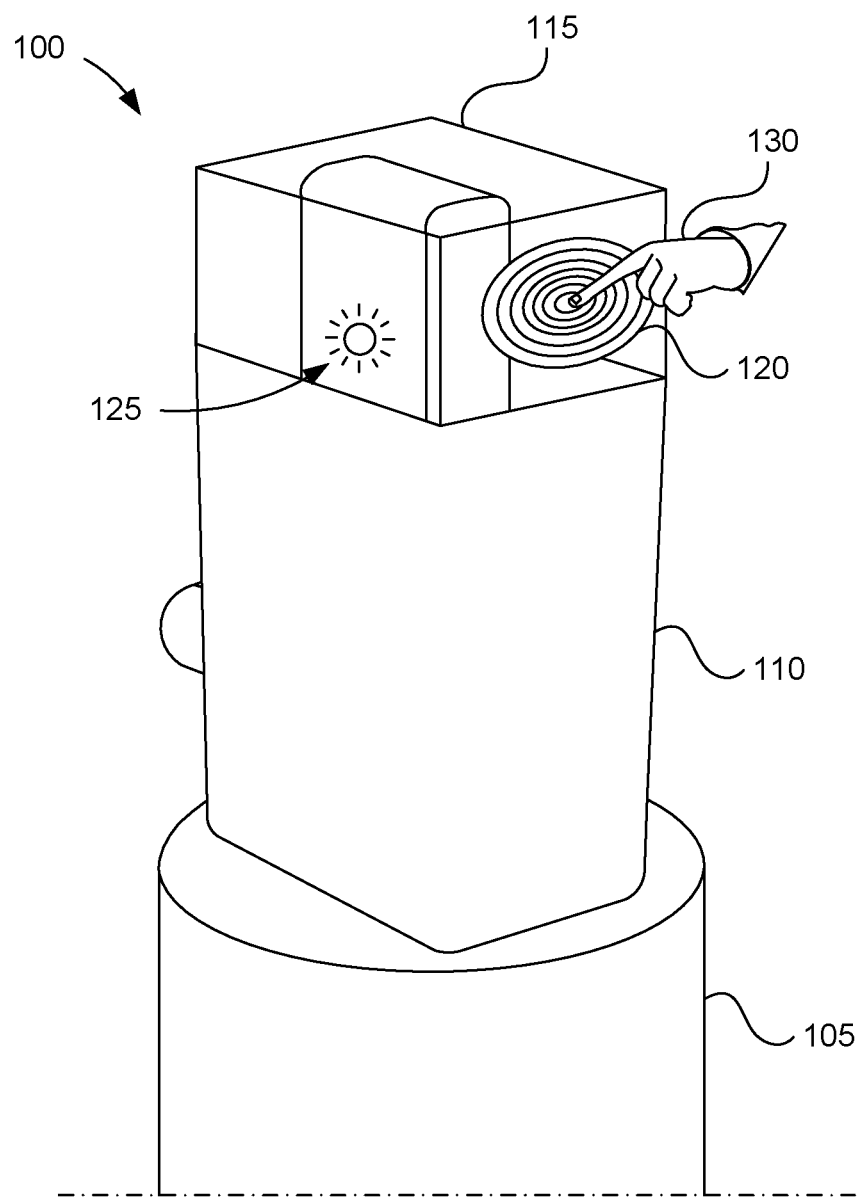
FIG. 1 depicts a perspective view of an exemplary industrial product installed with a protective housing.

FIG. 1 depicts a perspective view of an exemplary industrial product installed with a protective housing. An industrial system 100 includes an industrial product 105. In an illustrative embodiment, the industrial product 105 may be a valve for controlling the flow of fluids in a mass-production manufacturing facility. Various functions of the industrial product 105 are controlled by an electronic circuit board (not shown) housed within a retainer assembly 110 attached to the top of the industrial product 105. Attached to the top of the retainer assembly 110 is a protective housing 115. The protective housing 115 is sealably engaged with, and releasably attached to the top opening of the retainer assembly 110. The protective housing 115 includes a deformable membrane 120. The deformable membrane 120 is integrally formed with the protective housing 115. The deformable membrane 120 and the protective housing 115 form a sealed component.

Within the protective housing 115 is an indicator light 125 operably coupled to the electronic circuit board. The indicator light 125 may display different colors or blink to indicate the status of the programming of the electronic circuit board, which may be seen by a user though the (e.g., transparent or translucent) protective housing 115. Pressing the outer side of the deformable membrane 120 is a finger of a user's hand 130. The deformable membrane 120 is configured to provide enough deformation under a user's finger pressure to engage a programming switch (not shown) located within the protective housing 115. The programming switch is connected to the electronic circuit board to provide for programming functionality of the electronic circuit board.

In the exemplary embodiment of FIG. 1, the protective housing 115 has the shape of a rectangular prism with sharp corners and edges. In some embodiments, the protective housing 115 may have an at least partially curved shape with at least some smoothed corners/edges. In some examples, the programming switch may be any type of programming input device. For example, the programming input device may be a capacitive touchscreen. In some embodiments, the programming input device may be a proximity sensor.

Figure 2:
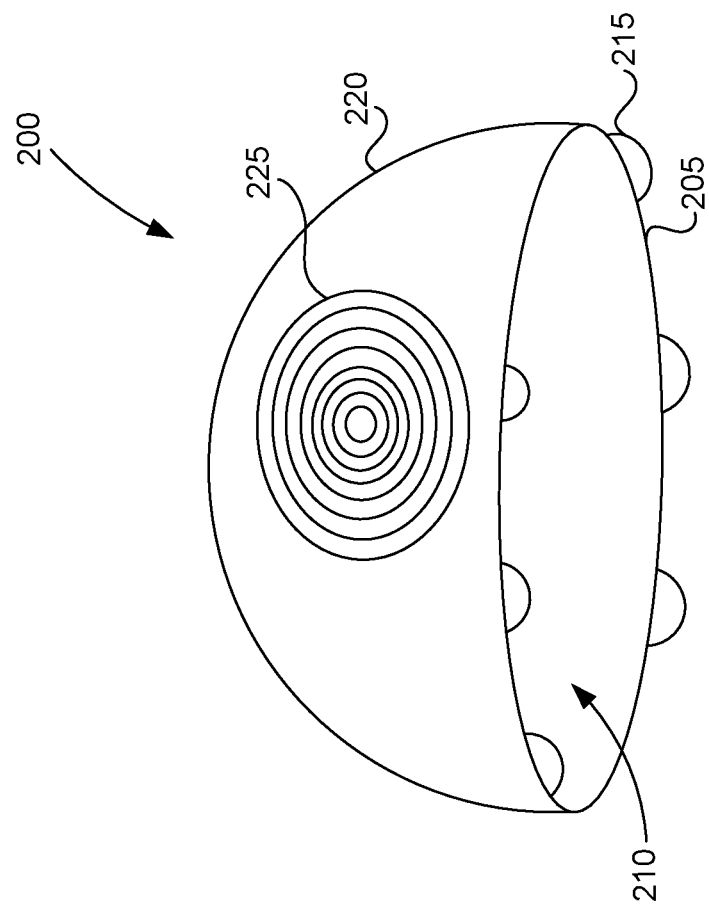
FIG. 2 depicts an underside perspective view of an exemplary protective housing.

FIG. 2 depicts an underside perspective view of an exemplary protective housing. In this illustrative embodiment, a protective housing 200 is dome-shaped. The protective housing 200 includes a bottom circular perimeter 205. The bottom circular perimeter 205 defines a bottom opening 210 in the protective housing 200. The bottom opening of 210 of the protective housing is configured to receive various components located within the retainer assembly 110 (e.g., the electronic circuit board, the indicator light 125, and the programming switch). Located along the bottom circular perimeter 205 are one or more snap members 215 that releasably attach the protective housing 200 to the retainer assembly 110. On the top side of the protective housing 200 is a curved top 220 (e.g., dome-shaped top). Also located on the protective housing 200 is a deformable membrane 225. The deformable membrane 225 deforms enough under a user's finger pressure to engage the programming switch connected to the electronic circuit board when the protective housing 200 is installed on the retainer assembly 110.

In some examples, the protective housing 200 may be transparent. In some embodiments, the protective housing 200 may be opaque or non-transparent. In some examples, the protective housing 200 may be made of an electrically dimmable material, so that it may be selectively dimmable by a user.

Figure 3:
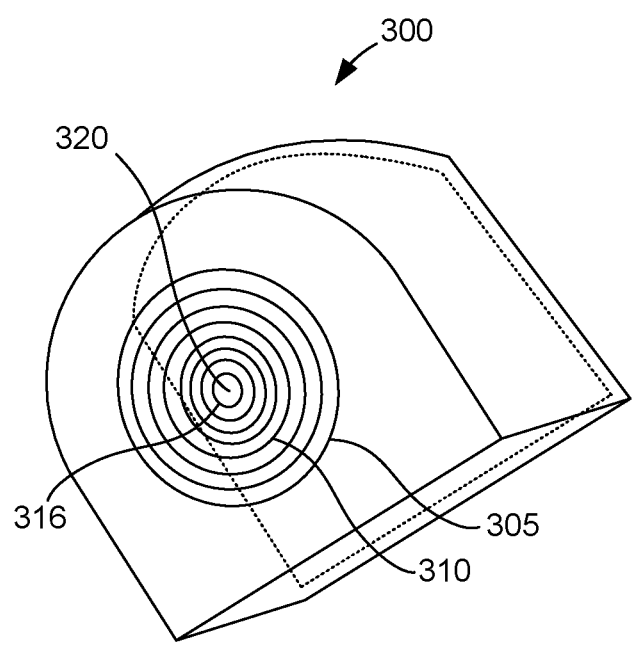
FIG. 3 depicts a front perspective view of an exemplary deformable membrane.

FIG. 3 depicts a front perspective view of an exemplary deformable membrane. A deformable membrane 300 includes two or more waves (e.g., an outer wave 305, an intermediate wave 310, and an inner wave 315). An outer wave 305 circumscribes the two or more waves. An intermediate wave 310 is disposed between the outer wave 305 and an inner wave 315. In this illustrative example, there are a total of 7 circular waves shown on the deformable membrane 300. In the center of the deformable membrane 300 is a pressing area 320. In response to a user applying finger pressure to the pressing area 320, the two or more waves deform (e.g., stretch). This deforming action may allow a user to interface with the programming switch to advantageously program the electronic circuit board from outside of the protective housing 200.

In some examples, there may be one or more waves on the deformable membrane. In some embodiments, there may be more than one pressing area. In various embodiments, the pressing area may be located in a non-central region of the deformable membrane. In various examples, the waves may be non-circular. In some examples, the waves may be periodic (e.g., uniformly spaced apart). In some examples, the waves may be aperiodic (e.g., non-uniformly distributed). For example, the distance between each consecutive wave may vary based on the radial distance from the pressing area.

Figure 4:
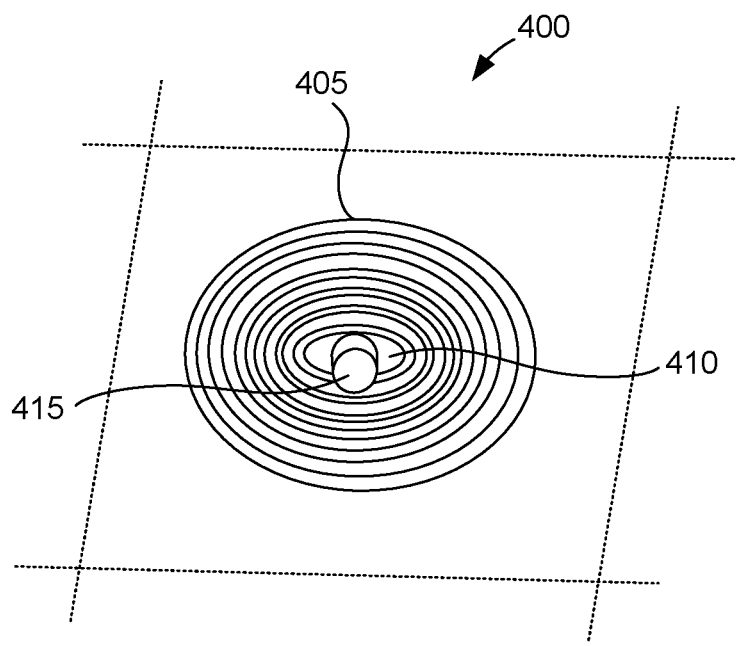
FIG. 4 depicts various perspective views of an exemplary elliptical deformable membrane with an extension member.
Figure 4:
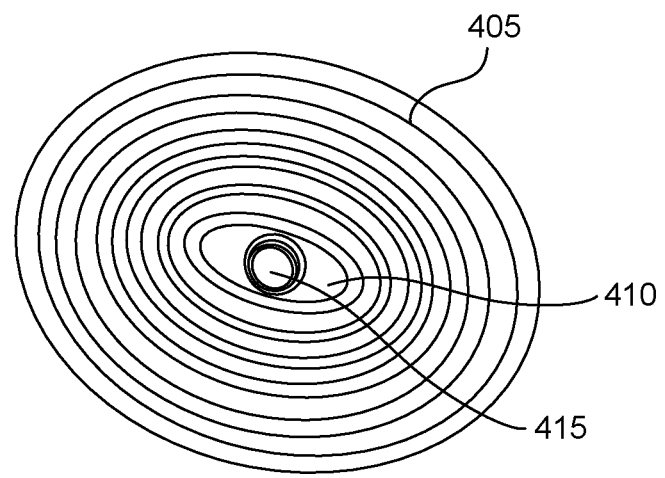
Figure 4:
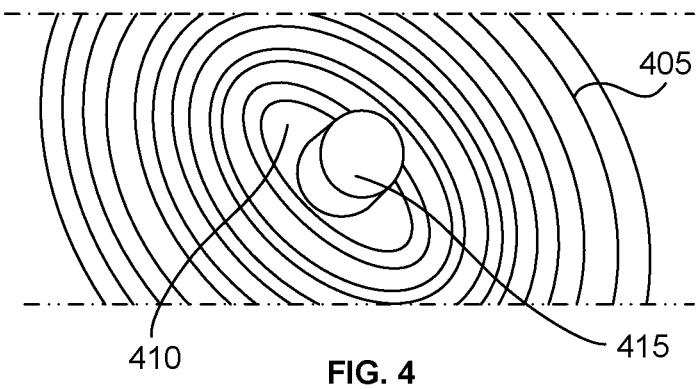

FIG. 4 depicts various perspective views of an exemplary elliptical deformable membrane with an extension member. An elliptical deformable membrane 400 includes waves 405. The waves 405 circumscribe in an elliptical fashion a central pressing area 410. The central pressing area 410 includes an extension member 415, which extends normal to the plane defined by the elliptical deformable membrane 400. In this illustrative example, the extension member 415 is substantially cylindrical. When the protective housing 200 is installed in the retainer assembly 110, the extension member 415 may engage the programming switch of the electronic circuit board upon a user pushing on the central pressing area 410. Accordingly, the extension member 415 may advantageously facilitate activation of the programming switch when the pressing area is not close enough to engage the programming switch by itself.

In some embodiments, the deformable membrane may have waves 405 that are non-elliptical in shape. For example, the waves 405 may have the shape of a spiral. In some examples, the extension member 415 may have a non-cylindrical shape. For example, the extension member 415 may have the shape of a cone or a polygonal prism. Furthermore, the extension member 415 may have electrical components on or within it that interface with the programming switch. The extension member 415 may have a conductive coating or be formed of a conductive elastomer, which may advantageously provide circuit completion when pressed onto an open circuit.

Figure 5:
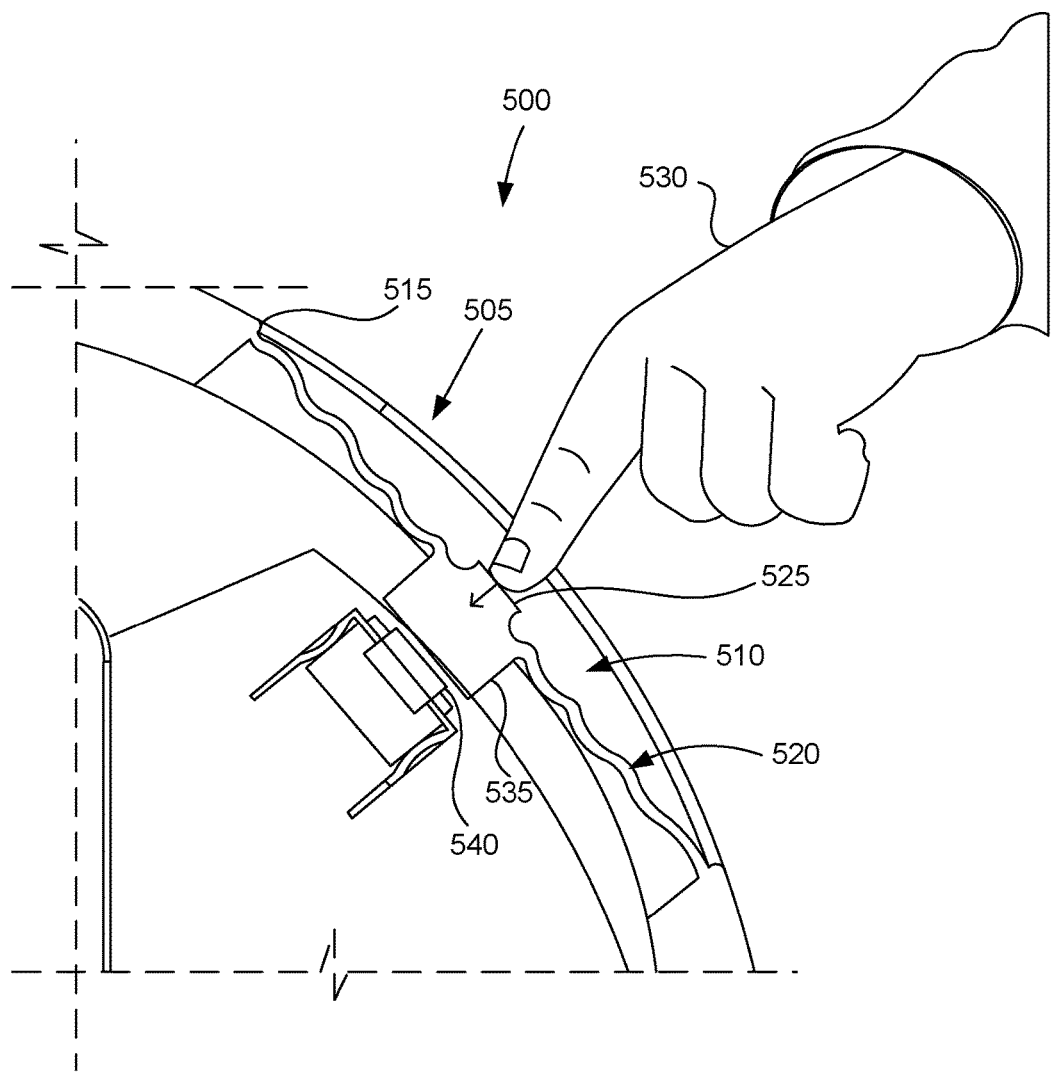
FIG. 5 depicts a cross-sectional view of an exemplary deformable membrane integrated with an exemplary protective housing, along with an exemplary programming switch.

FIG. 5 depicts a cross-sectional view of an exemplary deformable membrane integrated with an exemplary protective housing, along with an exemplary programming switch. An industrial system 500 includes a protective housing 505. The protective housing 505 includes a deformable membrane 510. The deformable membrane 510 has an outer boundary 515 where the deformable membrane 510 is formed with the rest of the protective housing 505.

Located on the deformable membrane 510 are waves 520. In this illustrative embodiment, a total of 3½ waves are radially distributed between the outer boundary 515 and the center of the deformable membrane 510. Located in the center of the deformable membrane 510 is a pressing area 525. The pressing area 525 is about to be engaged by a user's finger 530. The user's finger 530 may apply a force to the pressing area 525 once the user's finger 530 makes contact with the pressing area 525. The applied force may cause the deformable membrane 510 to deform or flex inward relative to the protective housing 505. This flex motion may cause an extension member 535 located on an inner center region of the deformable membrane 510 to engage a programming switch 540 located inside of the protective housing 505. As such, a user may advantageously program an electronic circuit board connected to the programming switch 540 without the need to open the industrial product housing the electronic circuit board.

Although the programming switch 540 may be depicted as a push-button switch, other types of structures for programming an electronic circuit board may be used. For example, the programming switch 540 may be a pressure sensor. In some examples, the programming switch 540 may be an open circuit that closes upon engagement with the extension member 535.

Figure 6:
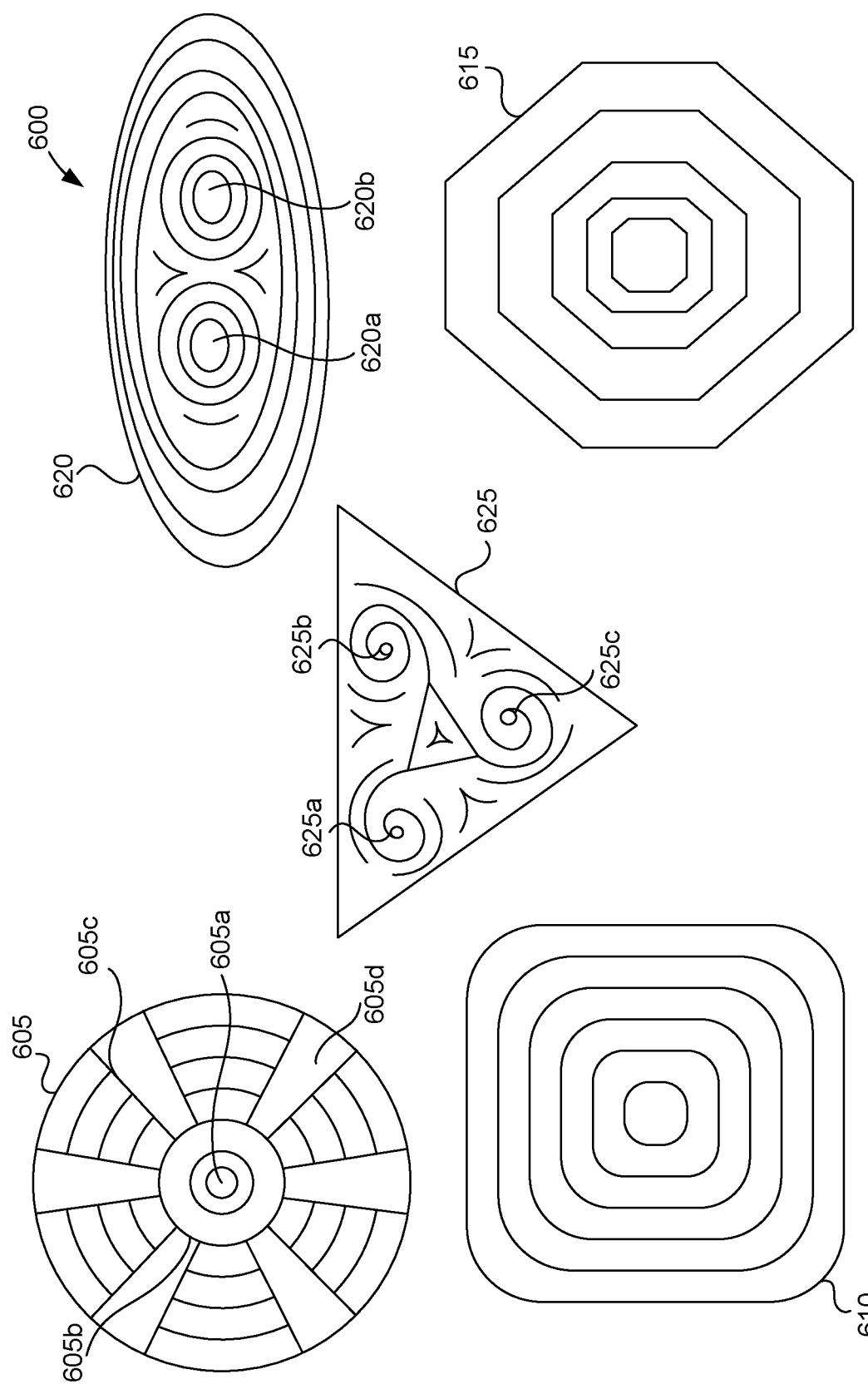
FIG. 6 depicts a plan view of various exemplary deformable membrane designs.

FIG. 6 depicts a plan view of various exemplary deformable membrane designs. A collection of deformable membrane designs 600 includes a first deformable membrane design 605. The first deformable membrane design 605 is depicted as having circular waves circumscribing a central pressing area 605a. The first deformable membrane design 605 includes innermost circular waves 605b and outermost circular waves 605c. The two innermost circular waves 605b are complete circular waves, while the four outermost circular waves 605c are periodically interrupted by a set of flat surfaces 605d. This construction may advantageously allow for a stronger, more resilient deformable membrane.

A collection of deformable membrane designs 600 includes a second deformable membrane design 610. A second deformable membrane design 610 has waves that are non-circular in nature. Specifically, the waves of the second deformable membrane design 610 are square shaped with rounded corners. These waves circumscribe a central pressing area, which also has the shape of a square with rounded corners.

A collection of deformable membrane designs 600 includes a third deformable membrane design 615. A third deformable membrane design 615 also has waves that are non-circular in nature. Specifically, the waves of the third deformable membrane design are octagon shaped. These waves circumscribe a central pressing area, which also has the shape of an octagon.

A collection of deformable membrane designs 600 includes a fourth deformable membrane design 620. A fourth deformable membrane design 620 has two pressing areas 620a and 620b. Some of the waves in the fourth deformable membrane design 620 are circular in shape, some are elliptical in shape, and some are neither circular nor elliptical in shape. This type of construction may advantageously allow for more than one input interface (e.g., two) with an electronic circuit board.

A collection of deformable membrane designs 600 includes a fifth deformable membrane design 625. A fifth deformable membrane design 625 has three pressing areas 625a, 625b, and 625c. The waves in the fifth deformable membrane design 625 are spiraled in shape, similar to a triskelion. This type of construction may advantageously allow for more than one input interface (e.g., three) with an electronic circuit board.

In some examples, there may be only a single pressing area on the deformable membrane. In some embodiments, there may be more than one pressing area on the deformable membrane. In some examples, the shape of the waves may be polygonal. In various embodiments, the shape of the waves may be curved.

Figure 7:
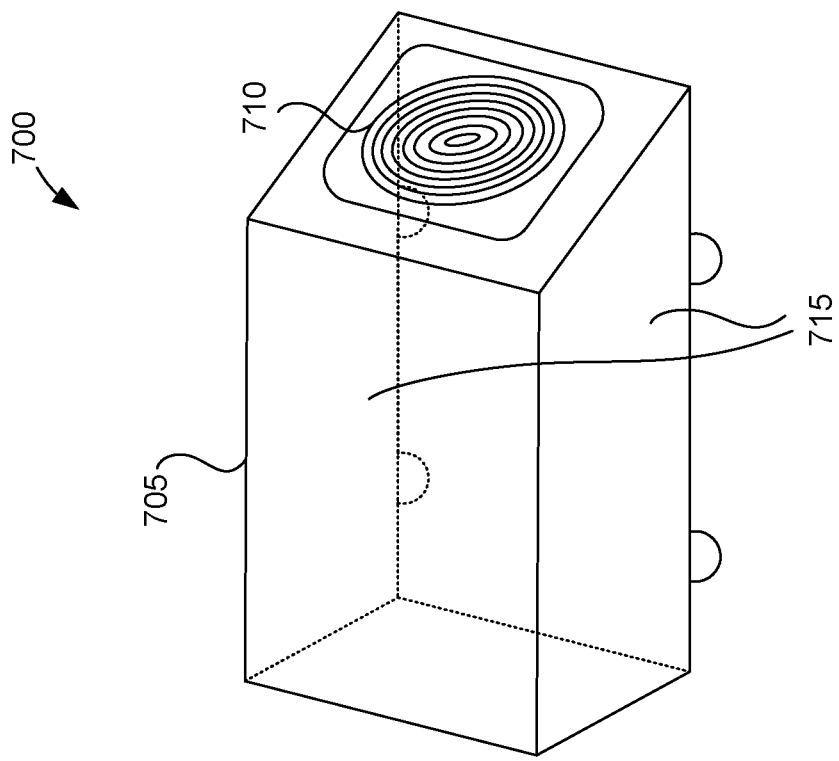
FIG. 7 depicts various perspective views of various exemplary protective housing designs.
Figure 7:
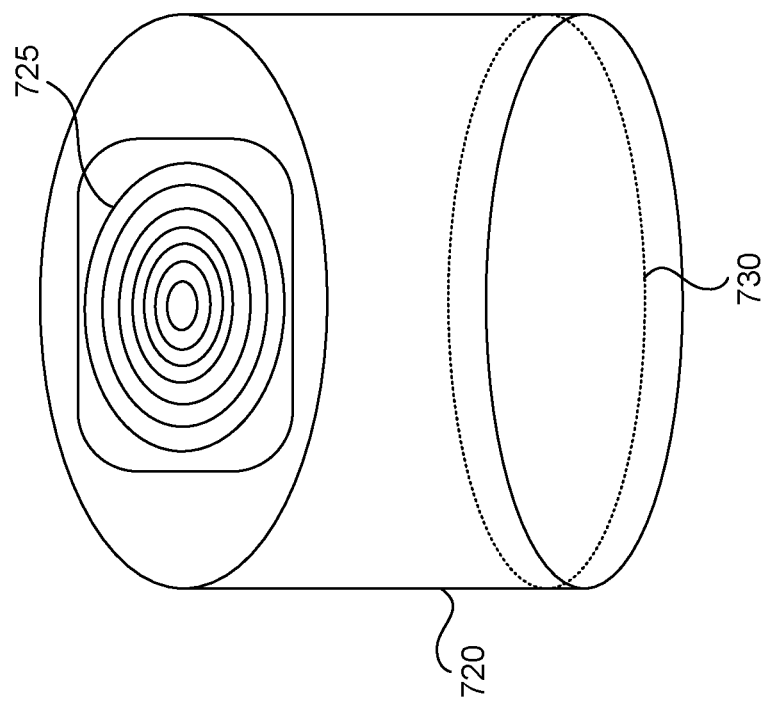

FIG. 7 depicts various perspective views of various exemplary protective housing designs. A collective of protective housing designs 700 includes a first protective housing design 705. The first protective housing design 705 includes a deformable membrane 710 formed on one surface of the first protective housing design 705. All surfaces of the first protective housing design 705 are rectangles, except for the side surfaces 715, which have the form of trapezoids. Such a construction may provide for a slanted surface on which the deformable membrane resides, advantageously making it easy for a user to press the deformable membrane with their finger.

A collective of protective housing designs 700 includes a second protective housing design 720. The second protective housing design 720 has the form of a cylinder with a closed top and opened bottom. Located on the center top portion of the second protective housing design 720 is a deformable membrane 725. The deformable membrane 725 has waves that emanate radially from the center of the top circular surface of the second protective housing design 720. The second protective housing design 720 also has a recessed inner lining 730 configured to engage snap members located on the industrial product.

Although various embodiments have been described with reference to the Figures, other embodiments are possible. For example, the protective housing may be formed out of a polymer material. In some embodiments, the protective housing may be formed out of rubber. In various examples, the protective housing may be formed out of a thermoplastic elastomer (TPE).

In various embodiments, the membrane may be formed of the same material, and may be created from the same molding process step, as the protective housing. In some examples, the deformable membrane may be composed of a different material from the rest of the protective housing. For example, the deformable membrane might be formed of polyamide, while the rest of the protective housing may be formed of a metal (e.g., aluminum). In some embodiments, the protective housing may be made of mu-metal, which may advantageously shield radiated fields. In some embodiments, a polymer housing may include a metallic coating to attenuate radiated fields. In some examples, the deformable membrane may be formed of a deformable material, while the rest of the protective housing may be formed of electrically dimmable glass.

The physical parameters of the protective housing may be defined as follows. The height of the protective housing may be about 1, 2, 5, 10, 20, 30, 40, or about 50 cm. The width of the protective housing may be about 1, 2, 5, 10, 20, 30, 40, or about 50 cm. The length of the protective housing may be about 1, 2, 5, 10, 20, 30, 40, or about 50 cm. The outer surface of the protective housing may have a surface area of about 5, 20, 125, 500, 2000, 4500, 8000, or about 12500 $cm^2$.

The physical parameters of the deformable membrane may be defined as follows. The deformable membrane may have a circular diameter of about 20, 40, 60, 80, 100, 120, 140, 160, 180, or about 200 mm. The deformable membrane may have a thickness of about 0.1, 0.5, 1, 2, 3, 4, 5, 6, 7, 8, 9, or about 10 mm. The deformable membrane may have a deformation of about 0.2, 0.5, 1, 2, 5, 10, 15, 20, 30, 40, or about 50 mm when 30 MPa of pressure is applied to the pressing area. The deformable membrane may be able to withstand a pressure of about 10, 15, 20, 25, 30, 35, 40, 45, 50, 60, 70, 80, 90, 100, 150, or about 200 MPa. The waved surface of the deformable membrane may have at least one wave having an amplitude between 0.2, 0.5, 1, 2, 3, 4, 5, 10, 15, or about 20 mm. The amplitude may refer to the maximum distance of the wave measured from a central position (e.g., the midpoint between maximum/minimum peaks). For example, a wave having a sinusoidal profile may have an amplitude of 1 mm, with a peak-to-peak distance of 2 mm.

In some examples, the protective housing may employ snap members which releasably attach the protective housing to an industrial product. In various embodiments, the protective housing may employ a recessed inner lining that engages snap members located on the industrial product. In various examples, other methods of sealably attaching the protective housing to the industrial product may be employed (e.g., magnets).

On industrial products that require a set-up or a configuration to be adapted to the application by the final customer, there may be a need to access a programming module. Programming may be performed by opening the industrial product to access to the electronic board and use the switches or connectors that are mounted on it. Set-up, configuration, and teach-in may be performed using the programming module. Such constructions may have drawbacks related to reliability and the safety. For example, a user can damage the electronic board while performing the product set-up. In some situations, product sealing is dependent on the user assembling everything properly once programming is completed.

In some products, a programming module may be mounted on the housing surface or may be accessible through an elastomer membrane that is over-molded on the housing. Such a construction may add to the cost (e.g., overall bill of materials, overall labor), and may make product sealing more complex to handle.

In various examples, the programming module may be accessible through a deformable membrane that has been designed into the product housing cover to provide enough deformation when a finger pressure is applied to activate a switch mounted on the electronic board inside the product. This deformable membrane may be part of the housing cover, and may not require an additional part or an additional process step. Due to the reduced labor and cost of manufacturing, such a construction may be cost effective and may make the housing very reliable.

In some examples, the membrane design may be overall flat and the waves on its shape may enable it to be deformable. The exact number of waves (e.g., 7) and their depth (e.g., 0.6 mm) may be customized to obtain a desired deformation (e.g., 0.1 mm) under a defined force/pressure (e.g., 10 N).

The design of the protective housing having a deformable membrane may be customized for a valve positioning device for the food and beverage market. In some embodiments, the deformable membrane is created with the protective housing in the same molding process. The number of waves and depth of these waves may be designed to withstand up to 10 times typical finger pressure on it. In some examples, the protective housing and deformable membrane may be very robust for industrial, commercial, and other applications.

In some examples, a protective apparatus may be adapted to couple to an industrial product. The protective apparatus may include a rigid housing having an opening in the bottom of the rigid housing and having a first wall thickness. The protective apparatus may further include a deformable membrane integrally and unitarily formed with the rigid housing and having a second wall thickness less than the first wall thickness. In some embodiments, the deformable membrane may include a waved surface and at least one pressing area surrounded by the waved surface. The waved surface may be configured to deform when a user's finger pressure is applied to the at least one pressing area, and return to an un-deformed state when the user's finger pressure is no longer applied to the at least one pressing area. The waved surface may include circular waves circumscribing the at least one pressing area.

In some examples, the rigid housing may include a curved top surface with the opening in the bottom of the rigid housing being oriented opposite of the curved top surface. The rigid housing may have the shape of a rectangular prism. The waved surface may include at least 3 waves. The rigid housing and deformable membrane may be formed of polyamide.

In various embodiments, the deformable membrane may have a circular diameter between 20 mm and 200 mm, a thickness between 0.1 mm and 10 mm, and a deformation between 0.2 mm and 20 mm when 10 N of force is applied normally to the at least one pressing area. The waved surface may include a plurality of waves having an amplitude between 0.2 mm and 20 mm.

In some embodiments, the protective apparatus may further include attachment sections fixed to the rigid housing, the attachment sections adapted for attaching the protective apparatus to the industrial product. The protective apparatus may include an extension member disposed on an inner side of the at least one pressing area, the extension member adapted to contact a programming module of the industrial product when the protective apparatus is installed on the industrial product and the user's finger pressure is applied to the at least one pressing area. In some examples, the rigid housing and the deformable membrane are formed by a single injection molding process.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A protective apparatus adapted to couple to an industrial product, the protective apparatus comprising:
  a rigid housing having an opening in the bottom of the rigid housing and having a first wall thickness;
  a deformable membrane integrally and unitarily formed with the rigid housing and having a second wall thickness less than the first wall thickness, the deformable membrane comprising:
    a waved surface; and,
    at least one pressing area surrounded by the waved surface, wherein the waved surface is configured to deform when a user's finger pressure is applied to the at least one pressing area, and return to an un-deformed state when the user's finger pressure is no longer applied to the at least one pressing area,
    wherein the waved surface comprises circular waves circumscribing the at least one pressing area, and,
  an extension member: (1) disposed on an inner side of the at least one pressing area, (2) protruding from the inner side of the at least one pressing area, and (3) integrally and unitarily formed with the deformable membrane.

2. The protective apparatus of claim 1, wherein the rigid housing comprises a curved top surface with the opening in the bottom of the rigid housing being oriented opposite of the curved top surface.

3. The protective apparatus of claim 1, wherein the rigid housing has the shape of a rectangular prism.

4. The protective apparatus of claim 1, wherein the waved surface comprises at least 3 waves.

5. The protective apparatus of claim 1, wherein the rigid housing and deformable membrane are formed of polyamide.

6. The protective apparatus of claim 1, wherein the deformable membrane has a circular diameter between 20 mm and 200 mm, a thickness between 0.1 mm and 10 mm, and a deformation between 0.2 mm and 20 mm when 10 N of force is applied normally to the at least one pressing area.

7. The protective apparatus of claim 1, wherein the waved surface comprises a plurality of waves having an amplitude between 0.2 mm and 20 mm.

8. The protective apparatus of claim 1, further comprising attachment sections fixed to the rigid housing, the attachment sections adapted for attaching the protective apparatus to the industrial product.

9. The protective apparatus of claim 1, wherein the extension member is adapted to contact a programming module of the industrial product when the protective apparatus is installed on the industrial product and the user's finger pressure is applied to the at least one pressing area.

10. The protective apparatus of claim 1, wherein the rigid housing and the deformable membrane are formed by a single injection molding process.

11. A protective apparatus adapted to couple to an industrial product, the protective apparatus comprising:
   a rigid housing having an opening in the bottom of the rigid housing and having a first wall thickness;
   a deformable membrane integrally and unitarily formed with the rigid housing and having a second wall thickness less than the first wall thickness, the deformable membrane comprising:
      a waved surface; and,
      at least one pressing area surrounded by the waved surface, wherein the waved surface is configured to deform when a user's finger pressure is applied to the at least one pressing area, and return to an un-deformed state when the user's finger pressure is no longer applied to the at least one pressing area, and,
   an extension member: (1) disposed on an inner side of the at least one pressing area, (2) protruding from the inner side of the at least one pressing area, and (3) integrally and unitarily formed with the deformable membrane.

12. The protective apparatus of claim 11, wherein the rigid housing comprises a curved top surface with the opening in the bottom of the rigid housing being oriented opposite of the curved top surface.

13. The protective apparatus of claim 11, wherein the waved surface comprises at least 3 waves.

14. The protective apparatus of claim 11, wherein the deformable membrane has a circular diameter between 20 mm and 200 mm, a thickness between 0.1 mm and 10 mm, and a deformation between 0.2 mm and 20 mm when 10 N of force is applied normally to the at least one pressing area.

15. The protective apparatus of claim 11, wherein the waved surface comprises a plurality of waves having an amplitude between 0.2 mm and 20 mm.

16. The protective apparatus of claim 11, wherein the extension member is adapted to contact a programming module of the industrial product when the protective apparatus is installed on the industrial product and the user's finger pressure is applied to the at least one pressing area.

17. The protective apparatus of claim 11, wherein the rigid housing and the deformable membrane are formed by a single injection molding process.

18. A protective apparatus adapted to couple to an industrial product, the protective apparatus comprising:
   a rigid housing having an opening in the bottom of the rigid housing and having a first wall thickness;
   a deformable membrane integrally and unitarily formed with the rigid housing and having a second wall thickness less than the first wall thickness, the deformable membrane comprising:
      a waved surface;
      at least one pressing area surrounded by the waved surface, wherein the waved surface is configured to deform when a user's finger pressure is applied to the at least one pressing area, and return to an un-deformed state when the user's finger pressure is no longer applied to the at least one pressing area; and,
   means for contacting a programming switch of the industrial product when the protective apparatus is installed on the industrial product and the user's finger pressure is applied to the at least one pressing area, wherein the means for contacting a programming switch comprises an extension member: (1) disposed on an inner side of the at least one pressing area, (2) protruding from the inner side of the at least one pressing area, and (3) integrally and unitarily formed with the deformable membrane.

19. The protective apparatus of claim 18, wherein the waved surface comprises at least 3 waves.

20. The protective apparatus of claim 18, wherein the deformable membrane has a circular diameter between 20 mm and 200 mm, a thickness between 0.1 mm and 10 mm, and a deformation between 0.2 mm and 20 mm when 10 N of force is applied normally to the at least one pressing area.

* * * * *